No. 856,285. PATENTED JUNE 11, 1907.
A. C. MURPHY.
PNEUMATIC DRILL.
APPLICATION FILED JULY 20, 1903.

2 SHEETS—SHEET 1.

Witnesses: Inventor: Albert C. Murphy,
By
Attorneys.

No. 856,285. PATENTED JUNE 11, 1907.
A. C. MURPHY.
PNEUMATIC DRILL.
APPLICATION FILED JULY 20, 1903.

2 SHEETS—SHEET 2.

Witnesses:

Inventor: Albert C. Murphy
By Carr & Carr,
Attorneys.

UNITED STATES PATENT OFFICE.

ALBERT C. MURPHY, OF EAST ST. LOUIS, ILLINOIS, ASSIGNOR TO STANDARD RAILWAY EQUIPMENT COMPANY, OF EAST ST. LOUIS, ILLINOIS, A CORPORATION.

PNEUMATIC DRILL.

No. 856,285.     Specification of Letters Patent.     Patented June 11, 1907.

Application filed July 20, 1903. Serial No. 166,281.

*To all whom it may concern:*

Be it known that I, ALBERT C. MURPHY, a citizen of the United States, and a resident of East St. Louis, county of St. Clair and State of Illinois, have invented certain new and useful Improvements in Pneumatic Drills, of which the following is a specification.

My invention relates to pneumatic drills and has for its principal objects to relieve the machine parts from the feeding pressure, to properly balance the working parts, to reduce the friction and to secure divers advantages hereinafter disclosed. It consists in the construction and in the arrangements and combinations of parts hereinafter described.

Figures 1, 2, 3:
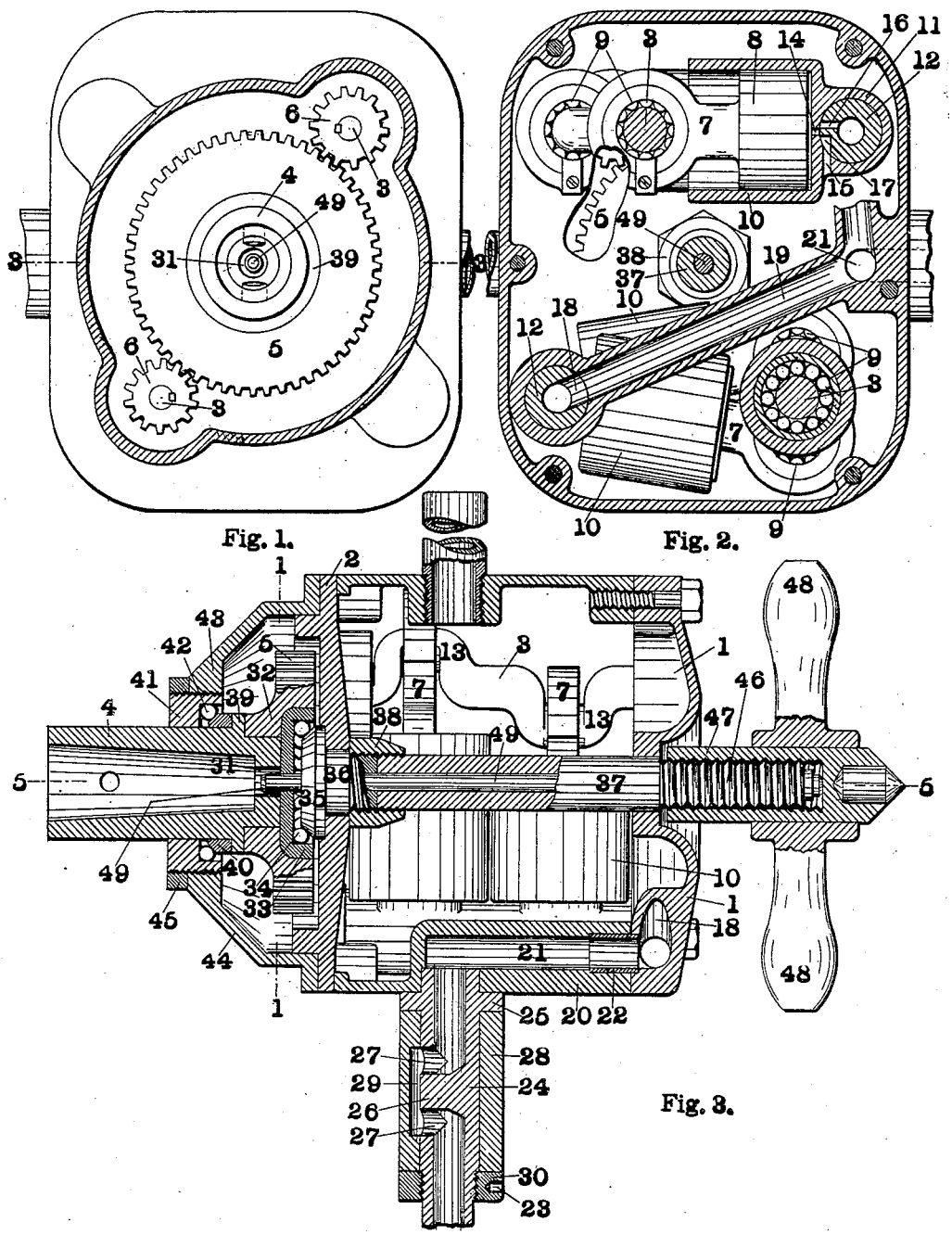
Figure 5:
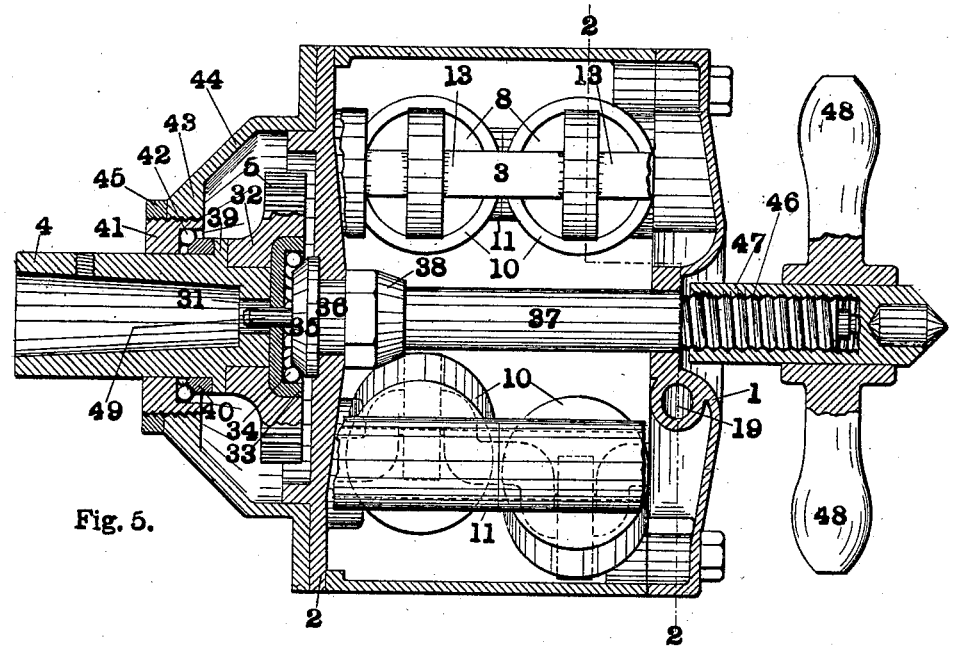
Figure 4:
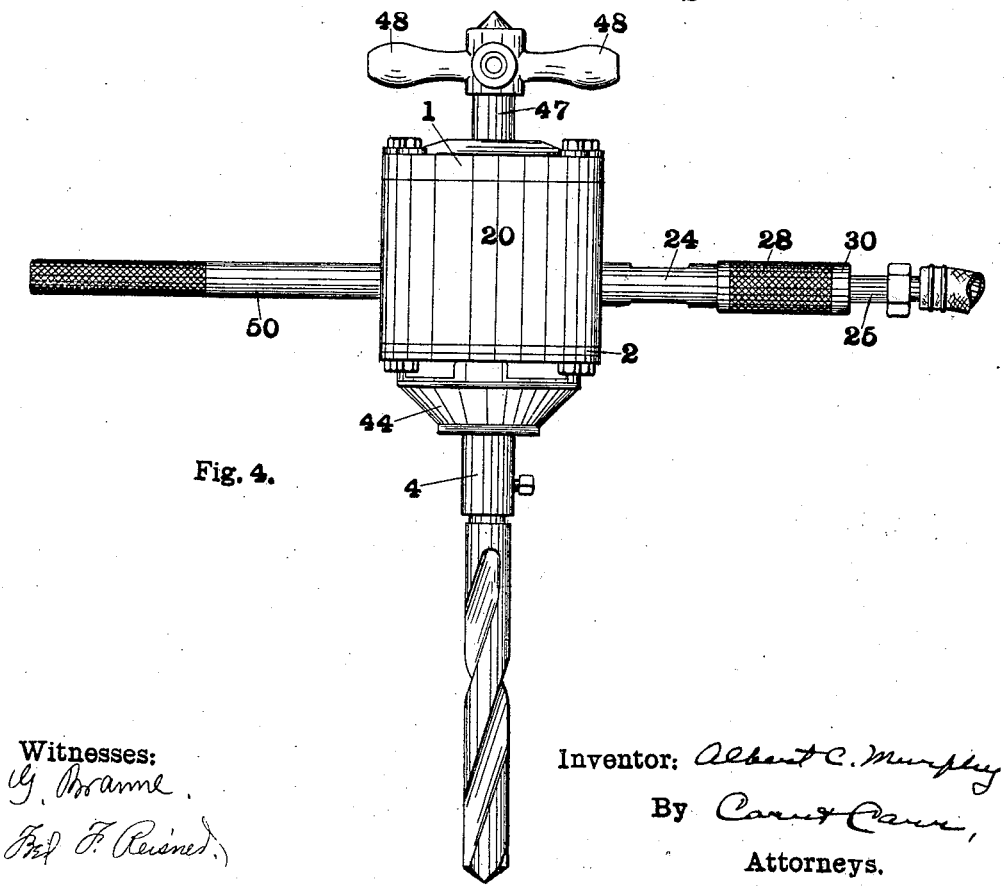

In the accompanying drawing, which forms part of this specification, and wherein like symbols refer to like parts wherever they occur, Figure 1 is a view of the parts forward of the main casing, the shell being shown in section on the line 1—1 of Fig. 3; Fig. 2 is a cross sectional view through the rear portion of the machine on the line 2—2 of Fig. 5; Fig. 3 is a horizontal central section of the machine on the line 3—3 of Fig. 1; and, Fig. 4 is a side elevation thereof. Fig. 5 is a central sectional view on the line 5—5 of Fig. 3 showing the contents of the main frame in plan.

The main frame of the machine is made in the form of a casing or housing. The opposite end members of this casing, that is the top casting 1 and the bottom casting 2, have journal bearings arranged therein for two parallel crank shafts 3. These crank shafts are arranged lengthwise of the casing and diametrically opposite each other at equal distances from the external axis of the main spindle 4. The main spindle 4 has a gear wheel 5 fixed thereto which meshes with and is driven by pinions 6 on the respective crank shafts. The crank shafts are connected directly to the stems 7 of their actuating pistons 8. For this purpose, each stem has a hole extending therethrough of sufficient size to permit the crank shaft to be inserted endwise into it, and the inner face of said hole is adapted to receive antifriction rollers 9 which are interposed between the crank and the inner surface of the hole.

The engines are of the oscillating type whose cylinders 10 have hubs 11 at their rear ends whereby they are journaled or swiveled upon hollow tubes or trunnions 12 arranged parallel with the crank shafts. As shown in the drawing, each shaft has two cranks 13 arranged at an angular distance of about 180 degrees apart, and there is a difference in phase between the two shafts of about 90 degrees. Each of the cylinders is a cup-shaped piece having a cylindrical socket or piston chamber in one end and having its opposite end closed or solid and formed into a hub 11 by means of a cylindrical hole extending transversely through the solid end portion. This cylindrical hole is of proper size to fit the hollow tube 12 which constitutes the trunnion thereof.

Each tube or trunnion 12 extends through the transverse holes in the hubs or rear end portions of the two cylinders which are connected to the same crank shaft, and has its ends secured in holes provided therefor in the top and bottom plates or castings of the casing, preferably by pressing said tube into said holes. Each of the cylinder pieces has two ports, one 14 extending longitudinally through its closed end from the cylinder chamber to the transverse hole in the hub thereof, and the other 15 extending transversely or laterally from the transverse hole in the hub to the surface of said hub. In the portion of the trunnion 12 which fits in said transverse hole, are a port 16 extending through the wall of the trunnion and a groove or channel 17 formed in the outer surface thereof. The port 16 in the trunnion is so located that the longitudinal port 14 of the cylinder will register with it when the piston is in its rearward position, and so that said ports 14, 16 will be out of register when the piston is near its forward position. The groove 17 in the trunnion is so located as to register with the longitudinal port 14 of the cylinder when the piston is in its forward position, and to be out of register therewith when the piston is in its rearward position. The transverse port 15 in the hub of the cylinder is arranged to register with the trunnion groove 17 when the longitudinal cylinder port 14 is in register with said groove.

The forward or bottom end of each of the two tubes or trunnions 12 is plugged or otherwise closed, but the rear or upper end thereof communicates either directly or through a slot 18 in its side with a hollow chamber or bore 19 formed in the top casting 1. On the inner side of the main portion 20 of the housing is formed a passageway 21 which is arranged to communicate with the chamber or bore 19 in the top casting. In order to make a tight joint between said chamber 19 and said passageway 21, said passageway is counterbored and a soft metal nipple 22 is pressed into it and the projecting portion of said nipple is pressed into a hole in said top casting which communicates directly with the chamber 19 thereof.

The passageway 21 communicates with the pressure supply pipe 23 as follows: Extending from said passageway 21 through the wall of the casing is a threaded hole into which is screwed a hollow threaded nipple or stem 24 which is provided with a circumferential flange or shoulder 25. This nipple or stem communicates directly with the supply pipe and itself constitutes one of the handles of the machine. The nipple or stem has a rib or partition 26 arranged crosswise of its bore and entirely closing it, but on each side of said partition are ports 27 extending through the wall of said nipple or stem. Fitting on the nipple is a sleeve 28 whose inner surface has a groove 29 cut therein of sufficient length to bridge the rib or partition 26 and connect the ports 27 on the opposite sides thereof. This sleeve is held in proper position by abutting at one end against the flange of the nipple and by means of a threaded nut 30 working on the nipple to abut against its opposite end. By this arrangement, the supply duct is opened by holding the sleeve so that its groove will register with the ports of the nipple; and it is closed by turning said sleeve to throw them out of register.

The main spindle 4 is of cylindrical form having a socket in its front end adapted to receive the shank of a drill or reamer or similar tool and having a slot 31 extending through its rear end of proper size and form to receive and coöperate with a tang formed therefor on the rear end of the shank of said tool. In order to minimize friction, the main spindle is equipped with ball bearings. For this purpose, the main driving gear 5 has a forwardly extending hub 32 which fits over the rear end of the spindle, and the central portion of the rear face of the gear is countersunk to receive a cup or shallow socket piece 33 and permit it to bear against the rear end of said spindle. This cup constitutes a ball race for antifriction balls 34 whose inner bearing is a cone or beveled disk 35 countersunk in the front wall or bottom plate of the casing. This cone has a hollow stem 36 which extends rearwardly through the bottom plate and has its internally projecting portion screw-threaded. Against the rear end of said stem abuts a hollow stud or strut 37 which is locked against turning and together with the stem 36 and cone 35 constitutes the thrust bar of the machine. The front end of said strut bar is threaded and is firmly secured to the stem of the bearing cone by a threaded nut or collar 38 which works on the threads of both the strut bar and the stem and abuts against the inner or rear face of the front wall.

The main spindle has a circumferential rib 39 thereon which forms a shoulder or abutment for the hub of the gear wheel 5 on its rear side, and which also serves as a shoulder or abutment for a beveled bearing ring or cone 40 on its front side. Fitting loosely over said spindle in front of said bearing ring or cone 40 is an externally threaded nut 41 whose end is countersunk to form a race-way for antifriction balls 42 between it and said cone. This threaded nut 41 works in a threaded hub 43 provided therefor in a bracket or shell 44 fixed to the end of the main casing and itself constituting a casing for the gear and pinions. The ball-race nut 41 is adjusted by securing it endwise in said hub and it is set in its adjusted position by means of a threaded nut 45 working thereon and jamming against the front hub.

The longitudinal strut or thrust bar 37 projects rearwardly through the casing and its projecting portion is externally threaded to constitute the feed screw 46. Working on this projecting threaded portion is the feed screw nut 47 consisting of an elongated threaded socket piece which is provided with handles 48 for turning it. Extending longitudinally through said thrust bar 37 and the stem of the bearing cone 35 and the ball-race cup 33 and the bottom of the spindle socket is a drive rod or ejecting pin 49. This drive-rod 49 is arranged to bear at its forward end against the tang on the end of the tool; and is engaged at its opposite end by the feed screw nut 47 when screwed down near its lowermost position on the feed screw. Thus the tool may be driven out of the main spindle 4. A change of tools is usually desired at the beginning of a boring at which time the feed screw nut is always screwed down on the feed screw, and is hence in the position desired for use with the drive rod 49.

The operation of the device is as follows: The sleeve 28 around the pressure pipe 23 constitutes the throttle valve, which is normally closed. By turning said sleeve, its groove 29 is brought into register with the ports 27 on opposite sides of the rib or partition 26 in the nipple or hollow stem 24 and air or other pressure medium is admitted into the passageway 21. From said passageway 21, the air passes into the chamber or bore 19 in the top casting and thence into the hollow trunnions 12. The hub of one or the other of the cylinders is in such position that its longitudinal port registers with the trunnion port 16. In this position of the cylinder, its piston is at the rearward limit of its stroke, so that the air admitted through the ports 16, 14 drives the piston forward, whereby the cylinder is caused to oscillate upon its trunnion and at the same time pressure is exerted against the crank arm of its shaft. Before the piston has reached the forward limit of its stroke, the oscillation of the cylinder carries or turns its longitudinal port 14 out of register with the trunnion supply port 16 and into register with the exhaust groove 17 in the periphery of the trunnion, whereby the air is cut off from the cylinder and the air in the cylinder is permitted to exhaust through the longitudinal port 14 the trunnion groove 17 and the transverse hub port 15 into the body of the casing. From the body of the casing the air passes into the atmosphere through the hollow handle 50, which is arranged diametrically opposite the pressure supply pipe. The foregoing operation is repeated by each of the four cylinders in turn with the result of maintaining a continuous revolution of the shafts. The turning of the shafts causes the pinions fixed thereto to drive the main gear and the spindle fixed thereto and the drill or other working tool in said spindle. From time to time in the operation, the feed screw nut is turned by hand to feed the entire machine forward so as to keep the working tool against the work.

The principal advantages of my invention are that the casing and working parts of the tool are entirely relieved of the forward thrust against the drill or other working tool, and that said thrust is applied centrally of the machine and in direct alinement with the drill or other working tool. Other principal advantages are that the cylinders are symmetrically arranged with reference to the axis of the main driving gear, that friction on the moving parts is reduced to a minimum, that the construction is easy and cheap to manufacture and assemble, that the throttle valve may be manipulated without changing the grip on the handle, and that the parts are accessible for cleaning and repair.

Obviously the construction hereinbefore described admits of considerable modification without departing from my invention and I do not wish to be restricted to the details of construction hereinbefore described.

What I claim is:

1. A pneumatic drill comprising a main spindle having a gear wheel thereon, a plurality of crank shafts parallel with said spindle and arranged symmetrically with respect thereto, a plurality of oscillating engines for each of said crank shafts the engines connected to one shaft being journaled on the same trunnion, and gear wheels on the respective crank shafts meshing with the gear wheel on the main spindle at equidistant points.

2. A pneumatic drill comprising a main spindle, two crank shafts for actuating said spindle arranged diametrically opposite each other and geared to said spindle at diametrically opposite points, and oscillating engines for actuating said crank shafts, the middle position of the engines operating on one crank shaft being substantially parallel with the middle position of the engines operating upon the other crank shaft.

3. A pneumatic drill comprising a main frame, a main spindle having a gear wheel fixed on its rear end and a ball-race countersunk in said gear wheel, and a thrust bar in alinement with said spindle and comprising a bearing cone at its forward end forward of said main frame to coöperate with said ball-race, balls in said ball-race, and a bracket forwardly projecting from said main frame and provided with a bearing for said main spindle.

4. A pneumatic drill comprising a main frame, a main spindle having a gear wheel fixed on its rear end and a ball-race countersunk in said gear wheel, and a thrust bar in alinement with said spindle and comprising a bearing cone at its front end forward of said main frame to coöperate with said ball-race, balls in said ball-race, the rear end of said thrust bar being screw-threaded and having a feed nut thereon, and a bracket projecting forwardly from said main frame and provided with a bearing for said main spindle.

5. A pneumatic drill comprising a main spindle, a plurality of crank shafts and trunnions parallel with said spindle and arranged symmetrically with respect thereto, a plurality of symmetrically arranged oscillating engines on each of said trunnions for actuating said crank shafts, a casing for the moving parts, and a thrust rod extending entirely through said casing in alinement with said spindle and arranged to take up the thrust thereon.

6. A pneumatic drill comprising a main spindle and having a gear wheel fixed on its rear end and a ball-race countersunk in said gear wheel, and a thrust bar in alinement with said spindle, and a bearing cone secured to said thrust bar to coöperate with said ball-race, and balls in said ball race, the rear end of said thrust bar being screw-threaded and having a feed nut thereon, and a drive rod extending through said thrust bar and the parts in alinement therewith, and said feed nut having a closed end arranged to bear against said drive rod when near one extremity of its movement.

7. A pneumatic drill comprising a main frame, a main spindle, a thrust bar in alinement with said spindle and extending through said main frame and a ball bearing interposed between said spindle and said thrust bar, said spindle having a bearing piece forward of said last mentioned bearing, and a second bearing piece mounted in a hub supported by said main frame, and balls between said bearing pieces.

8. A pneumatic drill comprising a main frame, a main spindle having a gear wheel fixed on the rear end thereof, a ball-race countersunk in said gear wheel, a thrust bar extending through said main frame in alinement with said spindle and having a bearing cone at the forward end thereof and balls between said bearing cone and said ball race, said spindle also having a beveled bearing ring thereon forward of said gear wheel, and a ball-race mounted in a hub supported by said main frame forward of said beveled ring, and balls between said ring and said ball-race.

9. A pneumatic drill comprising a main frame, a main spindle having a gear wheel fixed on the rear end thereof, a ball-race countersunk in said gear wheel, a thrust bar extending through said main frame in alinement with said spindle and having a bearing cone at the forward end thereof and balls between said bearing cone and said ball race, said spindle also having a beveled bearing ring thereon forward of said gear wheel, and an adjustable nut, constituting a ball race mounted in a hub supported by said main frame forward of said beveled ring, and balls between said ring and said ball race.

10. A drill comprising a main casing two hollow trunnions rigidly mounted therein, oscillating engines journaled thereon, parallel crank shafts actuated by said engines, a centrally located main spindle actuated by said crank shafts, and a thrust bar in alinement with said spindle and midway between said crank shafts.

11. A drill comprising two hollow trunnions, oscillating engines journaled thereon, parallel crank shafts actuated by said engines, a main spindle actuated by said crank shafts, and a thrust bar in alinement with said spindle and midway between said crank shafts, and a casing constituting the main frame of said drill, the top casting of said casing having a chamber communicating with said hollow trunnions and with the source of pressure.

12. A pneumatic drill comprising a main frame, a forwardly extending bracket thereon provided with a ball bearing, a main spindle journaled in said bearing and arranged outside of said main casing, said spindle having a ball-race and balls therein, and a thrust bar projecting through said main casing in alinement with said spindle and provided with a bearing cone forward of said main casing to coöperate with said ball race and balls in said main spindle.

13. A drill comprising a main casing, parallel hollow trunnions fixed therein at diametrically opposite points, parallel crank shafts mounted in said casing at diametrically opposite points, oscillating engines mounted on said trunnions to operate said crank shafts, a main spindle centrally located with respect to said casing and geared to said crank shafts and a thrust bar parallel to said trunnions and crank shafts and in alinement with said spindle, whereby said drill is balanced about said thrust bar.

14. In a portable motor, a tool spindle having a bore extending throughout its length, and adapted to receive a tool, a feed screw in line therewith, a slidable pin arranged in line with the feed screw and bore of the spindle and adapted to be forced by the feed screw against the shank of the tool to eject the tool.

St. Louis, Mo., July 11, 1903.

A. C. MURPHY.

Witnesses:
JAMES A. CARR,
JULIA B. MEGOWN.